United States Patent
Dunn

(10) Patent No.: US 9,919,213 B2
(45) Date of Patent: Mar. 20, 2018

(54) ZOOM CONTROLS FOR VIRTUAL ENVIRONMENT USER INTERFACES

(71) Applicant: Hothead Games Inc., Vancouver (CA)

(72) Inventor: Gregan Dunn, North Vancouver (CA)

(73) Assignee: Hothead Games Inc., Vancouver, BC (CA)

(*) Notice: Subject to any disclaimer, the term of this patent is extended or adjusted under 35 U.S.C. 154(b) by 0 days.

(21) Appl. No.: 15/145,699

(22) Filed: May 3, 2016

(65) Prior Publication Data
US 2017/0319961 A1 Nov. 9, 2017

(51) Int. Cl.
*A63F 13/525* (2014.01)
*G06F 3/0484* (2013.01)
*A63F 13/25* (2014.01)
*A63F 13/837* (2014.01)

(52) U.S. Cl.
CPC ............ *A63F 13/525* (2014.09); *A63F 13/25* (2014.09); *A63F 13/837* (2014.09); *G06F 3/04847* (2013.01); *G06F 2203/04806* (2013.01)

(58) Field of Classification Search
None
See application file for complete search history.

(56) References Cited

U.S. PATENT DOCUMENTS

| | | |
|---|---|---|
| 5,662,332 A | 9/1997 | Garfield |
| 5,772,512 A | 6/1998 | Chichester |
| 5,813,913 A | 9/1998 | Berner et al. |
| 6,174,237 B1 | 1/2001 | Stephenson |
| 6,648,760 B1 | 11/2003 | Nicastro |
| 7,666,094 B2 | 2/2010 | Baerlocher et al. |
| 7,867,086 B2 | 1/2011 | Sitrick |
| 7,881,976 B2 | 2/2011 | Dayton et al. |
| 8,002,618 B1 | 8/2011 | Lockton et al. |
| 8,149,530 B1 | 4/2012 | Lockton et al. |
| 8,209,628 B1 | 6/2012 | Davidson |
| 8,291,492 B2 | 10/2012 | McNally et al. |
| 8,365,074 B1 | 1/2013 | Wagner et al. |
| 8,385,596 B2 | 2/2013 | Latta et al. |

(Continued)

FOREIGN PATENT DOCUMENTS

| | | |
|---|---|---|
| CA | 2403006 | 9/2011 |
| CA | 2763349 | 7/2012 |

(Continued)

OTHER PUBLICATIONS

RRvirus, Sniper X game, Sep. 24, 2015, https://www.youtube.com/watch?v=v8LHzH9HVbl , p. 1.*

(Continued)

*Primary Examiner* — Tramar Harper
(74) *Attorney, Agent, or Firm* — Carr & Ferrell LLP

(57) ABSTRACT

Zoom controls for virtual environment user interfaces are provided herein. In one embodiment a computing system includes a processor and memory configured to provide a virtual gaming environment. The virtual game environment when executed includes a graphical user interface that has a radial zoom controller. The radial zoom controller is configured to allow a user to selectively control a zoom view and the radial zoom controller has an arcuate slider that is placed into concentric relationship with an activation button that allows the user to control an action within the virtual game environment.

14 Claims, 9 Drawing Sheets

(56) References Cited

U.S. PATENT DOCUMENTS

| | | |
|---|---|---|
| 8,597,142 B2 | 12/2013 | Mayles et al. |
| 8,608,485 B2 | 12/2013 | Teasdale et al. |
| 8,619,080 B2 | 12/2013 | Avent et al. |
| 8,645,396 B2 | 2/2014 | McNally et al. |
| 8,684,820 B2 | 4/2014 | DeYoung |
| 9,056,251 B2 | 6/2015 | Lockton |
| 9,195,369 B2 | 11/2015 | We et al. |
| 9,254,437 B2 | 2/2016 | Short et al. |
| 9,283,480 B2 | 3/2016 | DeYoung |
| 9,286,752 B2 | 3/2016 | Robbins et al. |
| 9,586,145 B2 | 3/2017 | DeYoung |
| 9,652,937 B2 | 5/2017 | Lockton |
| 2002/0043764 A1 | 4/2002 | Imhof |
| 2003/0038805 A1 | 2/2003 | Wong et al. |
| 2003/0127798 A1 | 7/2003 | Burrowes |
| 2004/0193484 A1 | 9/2004 | Allen |
| 2004/0227292 A1 | 11/2004 | Bodish |
| 2005/0079912 A1 | 4/2005 | Hanafusa |
| 2005/0184457 A1 | 8/2005 | Frieman |
| 2005/0282614 A1 | 12/2005 | Gauselmann |
| 2006/0082068 A1 | 4/2006 | Patchen |
| 2006/0135232 A1 | 6/2006 | Willis |
| 2006/0284852 A1 | 12/2006 | Hofmeister et al. |
| 2006/0287106 A1 | 12/2006 | Jensen |
| 2007/0015586 A1 | 1/2007 | Huston |
| 2007/0087835 A1 | 4/2007 | Van Luchene |
| 2007/0152984 A1* | 7/2007 | Ording ................ G06F 3/04845 345/173 |
| 2007/0191101 A1 | 8/2007 | Coliz et al. |
| 2007/0191102 A1 | 8/2007 | Coliz et al. |
| 2007/0265063 A1 | 11/2007 | McNally |
| 2008/0026847 A1 | 1/2008 | Mueller et al. |
| 2008/0058092 A1 | 3/2008 | Schwartz et al. |
| 2008/0090659 A1 | 4/2008 | Aguilar et al. |
| 2008/0147424 A1 | 6/2008 | Rowan et al. |
| 2008/0163055 A1 | 7/2008 | Ganz et al. |
| 2008/0215420 A1 | 9/2008 | Angelica |
| 2008/0228580 A1 | 9/2008 | Korman et al. |
| 2008/0261680 A1 | 10/2008 | Buecheler et al. |
| 2008/0270240 A1 | 10/2008 | Chu |
| 2009/0043868 A1 | 2/2009 | Hathaway |
| 2009/0072483 A1 | 3/2009 | Salomon et al. |
| 2009/0149236 A1 | 6/2009 | Van Luchene |
| 2009/0153389 A1 | 6/2009 | Kerr et al. |
| 2009/0157491 A1 | 6/2009 | Brougher et al. |
| 2009/0164937 A1* | 6/2009 | Alviar ................ G06F 3/03547 715/800 |
| 2009/0165128 A1 | 6/2009 | McNally et al. |
| 2009/0181770 A1* | 7/2009 | Viner .................... A63F 13/10 463/37 |
| 2009/0209335 A1 | 8/2009 | Pearce |
| 2009/0322498 A1 | 12/2009 | Yun et al. |
| 2010/0060661 A1 | 3/2010 | Avent et al. |
| 2010/0063993 A1 | 3/2010 | Higgins et al. |
| 2010/0082798 A1 | 4/2010 | Bhogal et al. |
| 2010/0122174 A1 | 5/2010 | Snibbe et al. |
| 2010/0123658 A1* | 5/2010 | Demuynck ............ G06F 3/0236 345/157 |
| 2010/0203952 A1 | 8/2010 | Zalewski |
| 2010/0261526 A1 | 10/2010 | Anderson et al. |
| 2010/0268580 A1 | 10/2010 | Vermes |
| 2010/0324981 A1 | 12/2010 | Etchegoyen |
| 2011/0028219 A1 | 2/2011 | Heatherly et al. |
| 2011/0095993 A1* | 4/2011 | Zuverink ............ G06F 3/04847 345/173 |
| 2011/0165926 A1 | 7/2011 | Hall |
| 2011/0183738 A1 | 7/2011 | Kimstotter |
| 2011/0184791 A1 | 7/2011 | Wang |
| 2011/0185318 A1 | 7/2011 | Hinckley et al. |
| 2011/0264491 A1 | 10/2011 | Birnbaum et al. |
| 2011/0264532 A1 | 10/2011 | Chan et al. |
| 2011/0300916 A1 | 12/2011 | Patchen |
| 2011/0300923 A1 | 12/2011 | Van Luchene |
| 2011/0306428 A1 | 12/2011 | Lockton et al. |
| 2012/0023444 A1 | 1/2012 | Patil et al. |
| 2012/0029990 A1 | 2/2012 | Fisher |
| 2012/0058808 A1 | 3/2012 | Lockton |
| 2012/0109728 A1 | 5/2012 | Sparks |
| 2012/0184349 A1 | 7/2012 | Barclay et al. |
| 2012/0232973 A1 | 9/2012 | Robb et al. |
| 2012/0246301 A1 | 9/2012 | Vyrros et al. |
| 2012/0274662 A1* | 11/2012 | Kim ....................... G06F 3/0488 345/650 |
| 2012/0290308 A1 | 11/2012 | Detwiller et al. |
| 2012/0290654 A1 | 11/2012 | Detwiller et al. |
| 2012/0309477 A1 | 12/2012 | Mayles et al. |
| 2013/0112202 A1* | 5/2013 | Fogelbrink ............ A61M 16/00 128/204.21 |
| 2013/0127731 A1* | 5/2013 | Song ....................... G06F 3/017 345/169 |
| 2013/0184040 A1 | 7/2013 | Nonaka et al. |
| 2013/0203480 A1 | 8/2013 | DeYoung |
| 2013/0205255 A1 | 8/2013 | We et al. |
| 2013/0218733 A1 | 8/2013 | Rago et al. |
| 2013/0288787 A1 | 10/2013 | Yoshie et al. |
| 2013/0296036 A1 | 11/2013 | Scott |
| 2013/0310169 A1 | 11/2013 | Satsuma |
| 2013/0344960 A1 | 12/2013 | Perry et al. |
| 2014/0047380 A1* | 2/2014 | Mak ....................... G06F 3/041 715/800 |
| 2014/0118563 A1 | 5/2014 | Mehta et al. |
| 2014/0179409 A1 | 6/2014 | DeYoung |
| 2014/0200061 A1 | 7/2014 | Isa et al. |
| 2014/0210164 A1 | 7/2014 | MacDonald et al. |
| 2014/0256389 A1 | 9/2014 | Wentling et al. |
| 2014/0274239 A1* | 9/2014 | Han ....................... A63F 13/00 463/2 |
| 2014/0274409 A1 | 9/2014 | Tinsman et al. |
| 2014/0349723 A1 | 11/2014 | Nakatani et al. |
| 2014/0358632 A1 | 12/2014 | Graff et al. |
| 2015/0046856 A1* | 2/2015 | Rucker .................. G06F 3/0488 715/765 |
| 2015/0094150 A1 | 4/2015 | Gregory et al. |
| 2015/0182854 A1 | 7/2015 | Edsall et al. |
| 2015/0182856 A1 | 7/2015 | Mays et al. |
| 2015/0238862 A1 | 8/2015 | Suzuki |
| 2015/0382066 A1* | 12/2015 | Heeter ............. H04N 21/47217 386/234 |
| 2016/0023106 A1 | 1/2016 | Mizuno |
| 2016/0026369 A1 | 1/2016 | We et al. |
| 2016/0096111 A1 | 4/2016 | DeYoung |
| 2016/0096113 A1 | 4/2016 | Decoufle |
| 2016/0236078 A1 | 8/2016 | Tokunaga |
| 2017/0014718 A1 | 1/2017 | Ceraldi et al. |
| 2017/0028303 A1 | 2/2017 | DeYoung |
| 2017/0036019 A1 | 2/2017 | Nielsen et al. |
| 2017/0072315 A1 | 3/2017 | Wada et al. |
| 2017/0368460 A1 | 12/2017 | Ceraldi et al. |
| 2017/0368461 A1 | 12/2017 | Ceraldi et al. |

FOREIGN PATENT DOCUMENTS

| | | |
|---|---|---|
| EP | 2182421 | 5/2010 |
| EP | 2812088 | 12/2014 |
| EP | 2812830 | 12/2014 |
| EP | 3117883 A1 | 1/2017 |
| EP | 3127587 A1 | 2/2017 |
| JP | 2001340656 A | 12/2001 |
| JP | 2002253859 A | 9/2002 |
| JP | 2003135854 A | 5/2003 |
| JP | 2006014956 A | 1/2006 |
| JP | 2006094877 A | 4/2006 |
| JP | 2007061317 A | 2/2007 |
| JP | 2005270649 A | 3/2007 |
| JP | 2007215721 A | 2/2009 |
| JP | 2009526603 A | 1/2010 |
| JP | 2010088560 A | 4/2010 |
| JP | 2010131083 A | 6/2010 |
| JP | 2010148812 A | 7/2010 |
| JP | 2010167251 A | 10/2010 |
| JP | 2009195415 A | 3/2011 |
| JP | 4975880 B1 | 7/2012 |

(56) References Cited

FOREIGN PATENT DOCUMENTS

| | | |
|---|---|---|
| JP | 2013208219 A | 10/2013 |
| JP | 2013226232 A | 11/2013 |
| JP | 2015008984 A | 1/2015 |
| JP | 2015073745 A | 4/2015 |
| JP | 2015077366 A | 4/2015 |
| JP | 2015091291 A | 5/2015 |
| JP | 6235084 B2 | 11/2017 |
| JP | 6243356 B2 | 11/2017 |
| KR | 1020070090730 | 9/2007 |
| KR | 1020100124428 | 11/2010 |
| KR | 1020110017188 | 2/2011 |
| KR | 1020170016801 | 7/2012 |
| KR | 1020170008697 A | 1/2017 |
| KR | 101725073 | 4/2017 |
| KR | 101754318 B1 | 6/2017 |
| KR | 1020170124964 A | 11/2017 |
| WO | WO0169364 A2 | 9/2001 |
| WO | WO 2011019188 | 2/2011 |
| WO | WO 2013/116926 | 8/2013 |
| WO | WO 2013/119702 | 8/2013 |
| WO | WO2017190228 A1 | 11/2017 |
| WO | WO2018000085 A1 | 1/2018 |

OTHER PUBLICATIONS

RRvirus, Hitman: Sniper, Jun. 4, 2015, https://www.youtube.com/watch?v=cJ4CPZUlzWg , p. 1.*

Marc the Geek, Hitman Sniper for Android Review, Jun. 5, 2015, https://www.youtube.com/watch?v=alMb7qtWnSA , times 1:52-1:54, 2:44-2:49, 3:38-3:40, 4:26-4:28, 4:48-4:54, p. 1.*

International Search Report and Written Opinion dated Apr. 15, 2013 in Application No. PCT/US13/024981.

International Search Report and Written Opinion dated Apr. 15, 2013 in Application No. PCT/US13/000101.

Extended European Search Report dated Dec. 11, 2014 in European Application No. 13746851.8.

Extended European Search Report dated Apr. 16, 2015 in European Application No. 13746523.3.

Dix, A., "Deconstructing Experience—pulling crackers apart" in: Blythe Funology: From Usability to Enjoyment, Human-Computer Interaction Series, (Dordecht, the Netherlands: Kluwer, 2003) ISBN 978-1-4020-2967-7, Ch. 13, pp. 165-178.

Office Action dated Aug. 28, 2015 in Korean Patent Application No. 10-2014-7024906 filed Sep. 4, 2014.

Office Action dated Nov. 11, 2015 in European Patent Application No. 13746851.8 filed Sep. 3, 2014.

Office Action dated Dec. 28, 2015 in Korean Patent Application No. 10-2014-7024936 filed Sep. 4, 2014.

Office Action dated Nov. 29, 2016 in Korean Patent Application No. 10-2014-7024906 filed Feb. 6, 2013, 3 pages [7 pages including translation].

Non-Final Office Action, dated Jun. 6, 2016, U.S. Appl. No. 13/306,917, filed Nov. 29, 2011.

Notice of Allowance, dated Oct. 28, 2016, U.S. Appl. No. 14/970,484, filed Dec. 15, 2015.

Final Office Action, dated Nov. 8, 2016, U.S. Appl. No. 13/306,917, filed Nov. 29, 2011.

Final Office Action, dated Aug. 18, 2016, U.S. Appl. No. 14/970,484, filed Dec. 15, 2015.

Non-Final Office Action, dated Sep. 21, 2016, U.S. Appl. No. 15/195,943, filed Jun. 28, 2016.

Non-Final Office Action, dated Sep. 27, 2016, U.S. Appl. No. 15/207,246, filed Jul. 11, 2016.

Ninja Theory Ltd, "Heavenly Sword manual" [online], Oct. 29, 2008 [retrieved on Sep. 16, 2016], Retrieved from the Internet: <URL:https://web.archive.org/web/20081029234359/http://fp.scea.com/Content/games/BCUS-98132/manual/manual.pdf>, 27 pages.

EightBitHD, "Heavenly Sword Walkthrough/Gameplay PS3 HD #1" [online], Oct. 7, 2012 [Retrieved on Sep. 16, 2016], Retrieved from the Internet: <URL:https://www.youtube.com/watch?v=qhOUHxsZKLU>, 3 pages.

Fouquet, Pierre, "A matter of slow death—Kill Cams: X-Ray Bullet Time" [online], Mar. 26, 2016 [retrieved on Sep. 16, 2016], Retrieved from the Internet: <URL:http://www.gameskinny.com/o408c/a-matter-of-slow-death-kill-cams-x-ray-bullet-time>, 7 pages.

Artman_12, "Camera orbit around 3d object using swipe" [online], Dec. 14, 2013 [retrieved Sep. 17, 2016], Retrieved from the Internet: <URL:http://answers.unity3d.com/questions/596739/camera-orbit-around-3d-object-using-swipe.html>, 5 pages.

Rebellion, "Sniper Elite III manual" [online], Feb. 6, 2014 [retrieved Sep. 17, 2016], Retrieved from the Internet: <URL: http://cdn.akami.steamstatic.com/steam/apps/238090/manuals/SE3_PC_ENG_Manual.pdf>, 9 pages.

Non-Final Office Action, dated Jun. 1, 2017, U.S. Appl. No. 15/294,296, filed Oct. 14, 2016.

Non-Final Office Action, dated Apr. 10, 2017, U.S. Appl. No. 13/106,716, filed May 12, 2011.

Non-Final Office Action, dated Apr. 12, 2017, U.S. Appl. No. 15/224,427, filed Jul. 29, 2016.

Final Office Action, dated Apr. 18, 2017, U.S. Appl. No. 15/207,246, filed Jul. 11, 2016.

"Office Action," Japan Patent Application No. 2016-138659, dated Sep. 5, 2017, 7 pages (15 pages including translation).

"Daemon," Tech Terms, Sep. 22, 2017. Retrieved from the Internet: <URL:https://techterms.com/definition/daemon), 1 page.

"Notice of Allowance," Japanese Patent Application No. 201615985, dated Sep. 26, 2017, 3 pages.

"International Search Report" and "Written Opinion of the International Searching Authority," Patent Cooperation Treaty Application No. PCT/CA2017/050775, dated Sep. 20, 2017, 9 pages.

"Notice of Allowance," Japan Patent Application No. 2014-555047, dated Oct. 17, 2017, 3 pages.

"Office Action," Japanese Patent Application No. 2014-555047, dated Feb. 7, 2017, 4 pages [7 pages including translation].

"Notice of Allowance," South Korea Patent Application No. 1020147024906, dated Apr. 20, 2017, 2 pages [3 pages including translation].

Omnomnick. CS:GO Update Adds Custom Weapon Skins [online]. Oct. 25, 2013 [retrieved Jun. 30, 2017]. Retrieved from the Internet: <URL:http://www.valvetime.net/threads/cs-go-update-adds-custom-weapon-skins.244024/>, 5 pages.

"Dämon," Computer Fachlexikon Fachwörterbuch, Microsoft Press, Third Edition, 1997, 3 pages.

"Daemon (computing)," Wikipedia, Jun. 22, 2016. Retrieved from the Internet: <URL:https://en.wikipedia.org/w/index.php?title=Daemon_(computing)&oldid=726414138), 4 pages.

"Notice of Allowance," European Patent Application No. 13746851.8, dated Jul. 18, 2017, 7 pages.

"Office Action," Japanese Patent Application No. 2014-555857, dated Jun. 20, 2017, [16 pages including translation].

"International Search Report" and "Written Opinion of the International Searching Authority," Patent Cooperation Treaty Application No. PCT/CA2017/050501, dated Aug. 8, 2017, 8 pages.

South Korean Patent Application No. 1020147024936, "Notice of Allowance," dated Jan. 11, 2017, 2 pages [3 pages including translation].

Office Action dated Dec. 13, 2016 in Japanese Patent Application No. 2014-555857 filed Feb. 6, 2013, 6 pages [12 pages including translation].

"Extended European Search Report" and "Written Opinion," European Patent Application No. 16182337.2, dated Dec. 2, 2016, 10 pages.

"Hearthstone: Heroes of Warcraft," from Wikipedia, the Free Encyclopedia [online], Jul. 29, 2015 [retrieved on Nov. 23, 2016], Retrieved from the Internet: <URL:https://en.wikipedia.org/w/index.php?title=Hearthstone:_Heroes_of_Warcraft&oldid=673644287>, 12 pages.

"Extended European Search Report" and "Written Opinion," European Patent Application No. 16179484.7, dated Dec. 7, 2016, 10 pages.

(56) References Cited

OTHER PUBLICATIONS

"Office Action," South Korea Patent Application No. 1020147024906, dated Jan. 26, 2017, 3 pages [6 pages including translation].

"Office Action," European Patent Application No. 13746851.8, dated Dec. 9, 2016, 4 pages.

Rrvirus. Kill Shot (By Hothead Games)—iOS—iPhone/iPad/iPod Touch Gameplay [online]. Jun. 15, 2014 [retrieved Feb. 22, 2017]. Retrieved from the Internet: <URL:https://www..youtube.com/watch?v=q3QjzlgKscw>, 4 pages.

Falcon 4.0 Manual. 1998 [retrieved on Feb. 10, 2017]. Retrieved from the Internet: <URL:http://download.high-g.net/files/Falcon_4_Manuals/f4_manual.pdf>, 24 pages.

Chalk, Andy. Sniper Elite 3 Unveils Ridiculously Graphic "X-Ray Killcam" [online]. Feb. 17, 2014 9:25 PM [retrieved Feb. 22, 2017]. Retrieved from the Internet: <URL:http://www.escapistmagazine.com/news/view/132299-Sniper-Elite-3-Unveils-Ridiculously-Graphic-X-Ray-Killcam>, 1 page.

Office Action dated Apr. 25, 2016 in Korean Patent Application No. 9-5-2016-029785251 (pp. 1-12).

Office Action dated Jul. 27, 2016 in Korean Patent Application No. 10-2014-7024936 filed Feb. 6, 2013, 9 pages.

Office Action dated Jun. 8, 2016 in European Patent Application No. 13746851.8 filed Feb. 6, 2013, 5 pages.

Notice of Allowance, dated Oct. 23, 2017, U.S. Appl. No. 15/195,943, filed Jun. 28, 2016.

Non-Final Office Action, dated Oct. 25, 2017, U.S. Appl. No. 15/294,296, filed Oct. 14, 2016.

Final Office Action, dated Oct. 30, 2017, U.S. Appl. No. 15/613,592, filed Jun. 5, 2017.

Advisory Action, dated Nov. 8, 2017, U.S. Appl. No. 15/224,427, filed Jul. 29, 2016.

"Office Action," European Patent Application No. 16179484.7, dated Aug. 30, 2017, 7 pages.

* cited by examiner

```
                                                              700
                                                                 ↘

┌─────────────────────────────────────────────────┐
          │  Generating a graphical user interface that comprises an initial │
          │  view of a gaming environment comprising a target placed at a    │
          │              distance away from a user                            │
          │                          705                                      │
          └─────────────────────────────────────────────────┘
                                   │
                                   ▼
          ┌─────────────────────────────────────────────────┐
          │   Providing a radial zoom controller within the graphical user   │
          │  interface, the radial zoom controller comprising an arcuate slider │
          │   that is placed into concentric relationship with an activation │
          │      button that controls an action within the virtual game     │
          │    environment, the arcuate slider comprising magnification levels │
          │                          710                                      │
          └─────────────────────────────────────────────────┘
                                   │
                                   ▼
          ┌─────────────────────────────────────────────────┐
          │    Receiving user input from the arcuate slider to select a      │
          │  magnification level of a zoom view, the zoom view being a scope  │
          │     view of a weapon, the zoom view comprising the target        │
          │                          715                                      │
          └─────────────────────────────────────────────────┘
                                   │
                                   ▼
          ┌─────────────────────────────────────────────────┐
          │ Selectively adjusting magnification level of the zoom view as the │
          │              user moves the arcuate slider                        │
          │                          720                                      │
          └─────────────────────────────────────────────────┘
```

*FIG. 7*

ZOOM CONTROLS FOR VIRTUAL ENVIRONMENT USER INTERFACES

FIELD OF THE PRESENT TECHNOLOGY

The present technology relates generally to virtual gaming, and more specifically, but not by limitation, to radial and linear zoom controls for use in virtual environment user interfaces, such as video game environments.

SUMMARY

According to some embodiments, the present disclosure is directed to a computing system, comprising: a processor and memory configured to provide a virtual gaming environment, wherein the virtual game environment when executed comprises a graphical user interface that comprises a radial zoom controller, the radial zoom controller being configured to allow a user to selectively control a zoom view, the radial zoom controller comprising an arcuate slider that is placed into concentric relationship with an activation button that allows the user to control an action within the virtual game environment.

In other embodiments, the present disclosure is directed to a method comprising: (a) providing a virtual gaming environment, wherein the virtual game environment when executed comprises a graphical user interface that comprises a radial zoom controller, the radial zoom controller comprising an arcuate slider that is placed into concentric relationship with an activation button that controls an action within the virtual game environment; (b) receiving a first user input from the arcuate slider; (c) selectively control magnification of a zoom view based on the first user input; (d) receiving a second user input from the activation button; and (e) causing the action within the virtual game environment based on the second user input.

In other embodiments, the present disclosure is directed to a method comprising: (a) generating a graphical user interface that comprises an initial view of a gaming environment comprising a target placed at a distance away from a user; (b) providing a radial zoom controller within the graphical user interface, the radial zoom controller comprising an arcuate slider that is placed into concentric relationship with an activation button that controls an action within the virtual game environment, the arcuate slider comprising magnification levels; (c) receiving user input from the arcuate slider to select a magnification level of a zoom view, the zoom view being a scope view of a weapon, the zoom view comprising the target; and (d) selectively adjusting magnification level of the zoom view as the user moves the arcuate slider.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 7 is a flowchart of another example method for providing a radial zoom controller and selectively controlling a zoom view.

DESCRIPTION OF EXEMPLARY EMBODIMENTS

Figure 1:
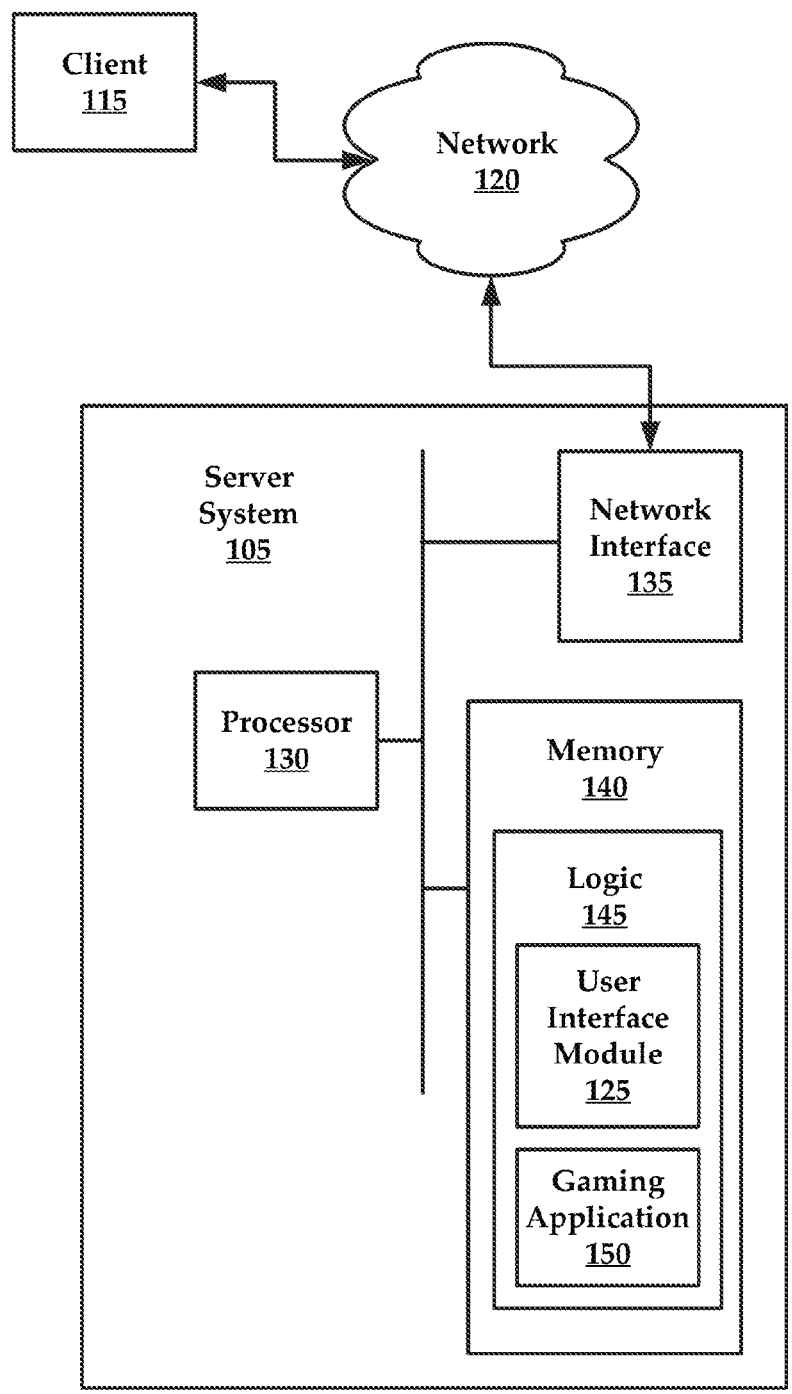
FIG. 1 is a schematic diagram of an exemplary computing architecture that can be used to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

In general, the present technology comprises radial zoom controls for virtual environments such as video games. In one embodiment a radial zoom control comprises a rounded shoot button, a slider that curves around the shoot button, and/or that goes vertically up above the shoot button. The slider controls a zoom level of a gun. The slider comprises of a rest area that has the weapon setup without the scope. In some embodiments, a slider area extends from the minimum magnification level to the maximum magnification.

The user can control the slider by sliding their fingers along it or tap along the slider to control the magnification level allowing the user to jump quickly from no magnification to full magnification or to finely control the magnification to ensure the target is properly framed in the sight. Thus, the user can infinitely control the magnification level.

FIG. 1 illustrates an exemplary architecture for practicing aspects of the present technology. The architecture comprises a server system, hereinafter "system 105" that is configured to provide various functionalities, which are described in greater detail throughout this document. Generally, the system 105 is configured to communicate with client devices, such as client 115. The client 115 may include, for example, a Smartphone, a laptop, a computer, or other similar computing device. An example of a computing device that can be utilized in accordance with the present technology is described in greater detail with respect to FIG. 9.

The system 105 may communicatively couple with the client 115 via a public or private network, such as network 120. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 105 generally comprises a processor, 130, a network interface 135, and a memory 140. According to some embodiments, the memory 140 comprises logic (e.g., instructions) 145 that can be executed by the processor 130 to perform various methods. For example, the logic 145 may include a video game client application (hereinafter "gaming application 150") and a user interface module 125, which are configured to provide the functionalities described in greater detail herein.

It will be understood that the functionalities described herein, which are attributed to the system 105 may also be executed within the client 115. That is, the client 115 may be programmed to execute the functionalities described herein. In other instances, the system 105 and client 115 may cooperate to provide the functionalities described herein, such that the client 115 is provided with a client-side application that interacts with the system 105 such that the system 105 and client 115 operate in a client/server relationship. Complex computational features may be executed by the system 105, while simple operations that require fewer computational resources may be executed by the client 115, such as data gathering and data display.

In general, all the user interface module 125 may be executed by the system 105 to provide various graphical user interfaces (GUIs) that allow users to interact with the system 105. In some instances, GUIs are generated by execution of the gaming application 150. Users may interact with the system 105 using, for example, a client 115. The system 105 may generate web-based interfaces for the client.

The gaming application 150 can be executed locally on a user device (e.g., client 115), such as a Smartphone or tablet device. Alternatively, the gaming application 150 can be accessed by a user device over a network. Thus, the gaming application 150 can be executed on a server and accessed by the user device using a browser application. The server will serve GUIs of the gaming application 150 as web pages of a standard or mobile website.

In some embodiments, the gaming application 150 is configured to provide the user with a gaming experience, such as a virtual gaming environment where the user participates in gameplay. Examples of virtual gaming environments include, but are not limited to role playing games, first person shooter games, multiplayer games, sporting games, and so forth.

The gaming application 150 generates various graphical user interfaces such as the GUIs of FIGS. 2-5. By way of example, the GUI of FIG. 2 comprises a radial zoom controller 202. In some embodiments, the radial zoom controller 202 allows a user to selectively control a zoom view of, for example, a scope of a weapon.

The radial zoom controller 202 is provided on a GUI 204 that comprises a video game environment 206. In this example, the video game environment 206 is a first person shooter video game and comprises a target 208 placed at a distance away from the player.

Figure 2:
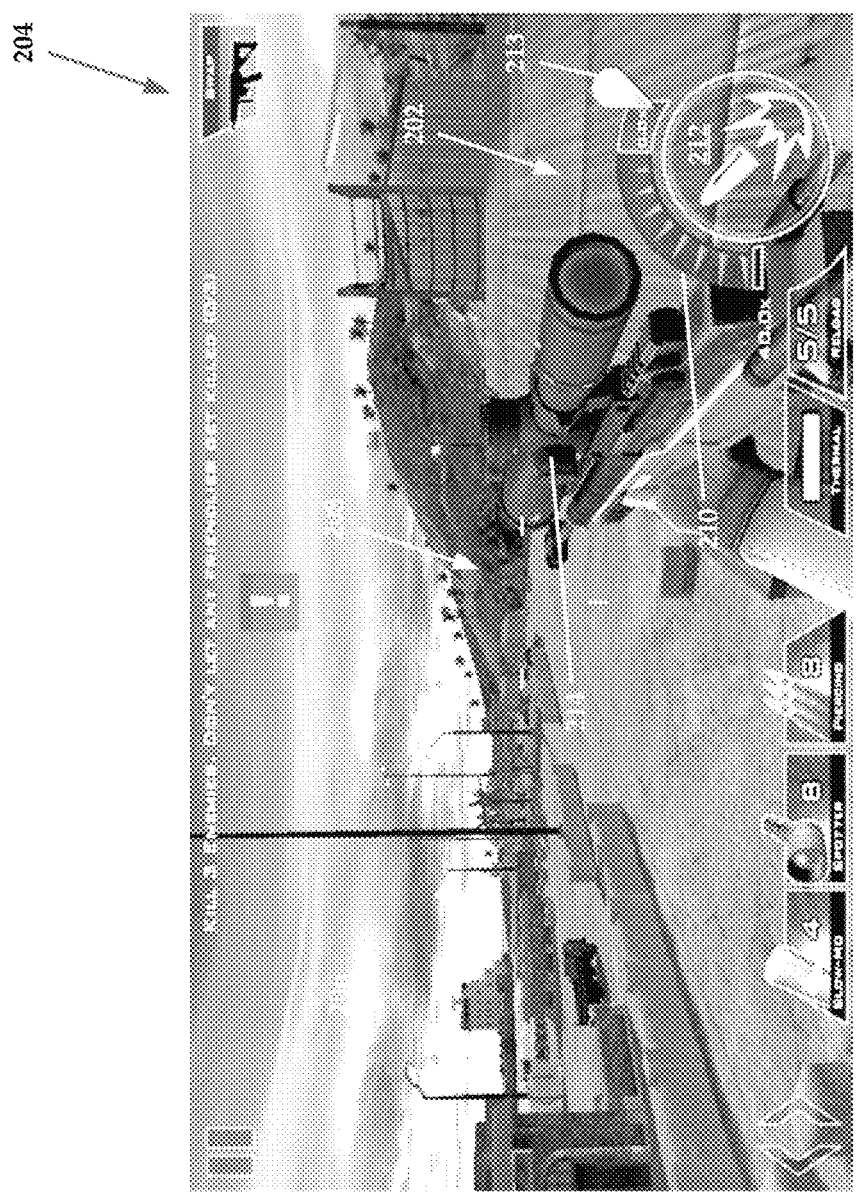
FIG. 2 is a GUI that comprises a radial zoom controller.

The radial zoom controller 202 comprises an arcuate slider 210 that is placed into concentric relationship with an activation button 212 that allows the user to control an action within the video game environment 206 such as firing a weapon 214. In some embodiments, the radial zoom controller 202 can be placed onto the GUI in any location, but as illustrated in FIG. 2, the radial zoom controller 202 is placed into a lower corner. In some embodiments, the arcuate slider 210 can comprise a slider tab 213 that the user can utilize to select a magnification level.

The user can touch the arcuate slider 210 at the 0.0× position to initiate the zoom view. In some embodiments, when the arcuate slider 210 is placed in the 0.0× zoom level (e.g., magnification), the view is from a viewpoint of the player, such as in FIG. 2. When the zoom level (e.g., magnification) is increased above 0.0×, the view switches to a scope view such as in FIGS. 3-5.

Figure 3:
FIGS. 3-5 collectively illustrate zooming of a virtual weapon using the radial zoom controller.

FIG. 3 illustrates the zoom view, which includes a representation of a view that would be seen through a scope of a weapon. As the user slides their finger across the arcuate slider 210 towards the 40.0× position, the zoom will increase, bringing targets 208 within the zoom view into closer view. The arcuate slider 210 can, in some embodiments, comprise a distance measurement. For example, the objects in the zoom view of FIG. 3 are at a position of 1354.4 meters.

Figure 4:
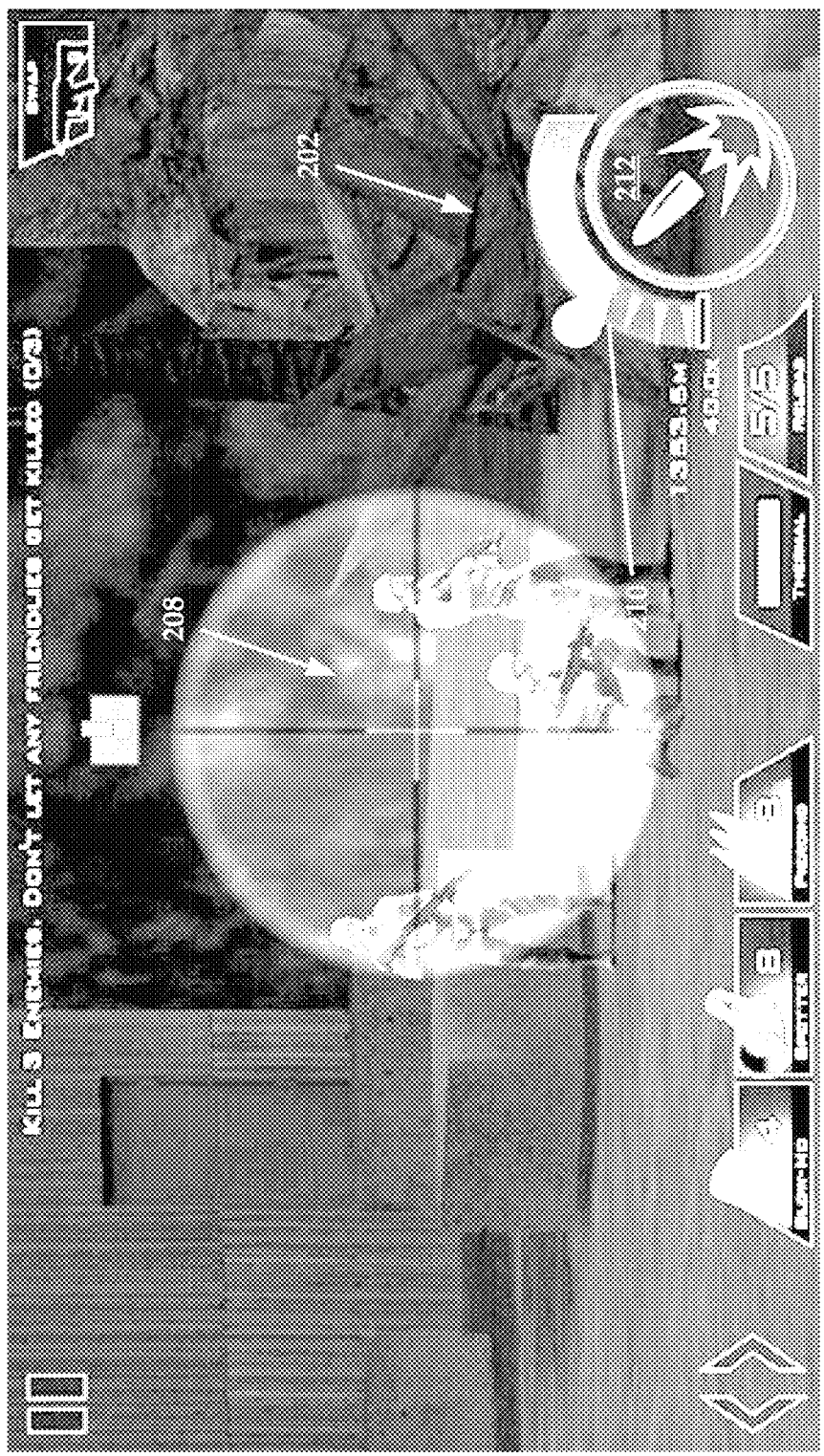
Figure 5:
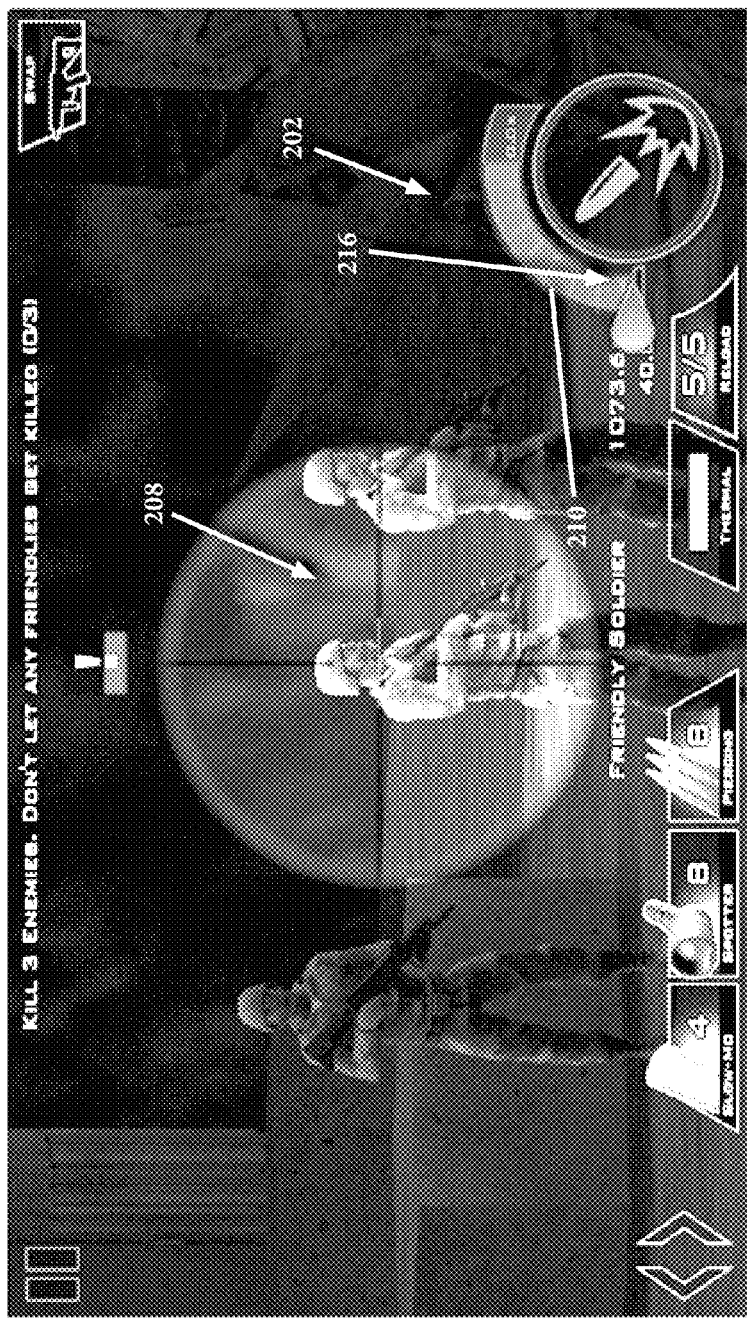

FIG. 4 illustrates the zoom view at approximately 20.0× zoom, where the arcuate slider is moved further towards a full zoom position. FIG. 5 illustrates the zoom view at 40.0× zoom, or full zoom 216. Again, the user can selectively adjust the magnification/zoom level infinitely between any minimum and maximum level set for the zoom view. To be sure, magnification levels for a zoom view for one weapon may be different from magnification levels for a zoom view of a different weapon. For example, the first weapon could include a shotgun and the other weapon could include a sniper rifle. To be sure, the possible zoom views of these weapons are quite different because the sniper rifle may include a scope with much greater magnification than the sight view of the shotgun.

In some embodiments, the radial zoom controller can comprise a slider tab that can be selected by a finger of a user to selectively adjust a position of the arcuate slider. Rather than using the slider tab, the user can tap within the arcuate slider to place the weapon at a specific zoom level quickly. The slider tab can be used for fine adjustments to the zoom level.

Advantageously, in some embodiments the radial zoom controller can comprise an activation button that is placed concentrically inside the arcuate slider. For example, the activation button can be used to fire a weapon, such as the weapon associated with the scope that creates the zoom view.

Thus, the user can selectively adjust the zoom view with one finger and activate an action within the gaming environment with a second finger.

In general, the radial zoom controller allows a user to control two aspects of an object within the gaming environment. By way of example, a first aspect includes the zooming and aiming of a weapon, while the second aspect is the discharging of the weapon.

The activation button can be assigned additional functionalities corresponding to actions such as weapon reloading, weapon changing, and so forth.

Figure 6:
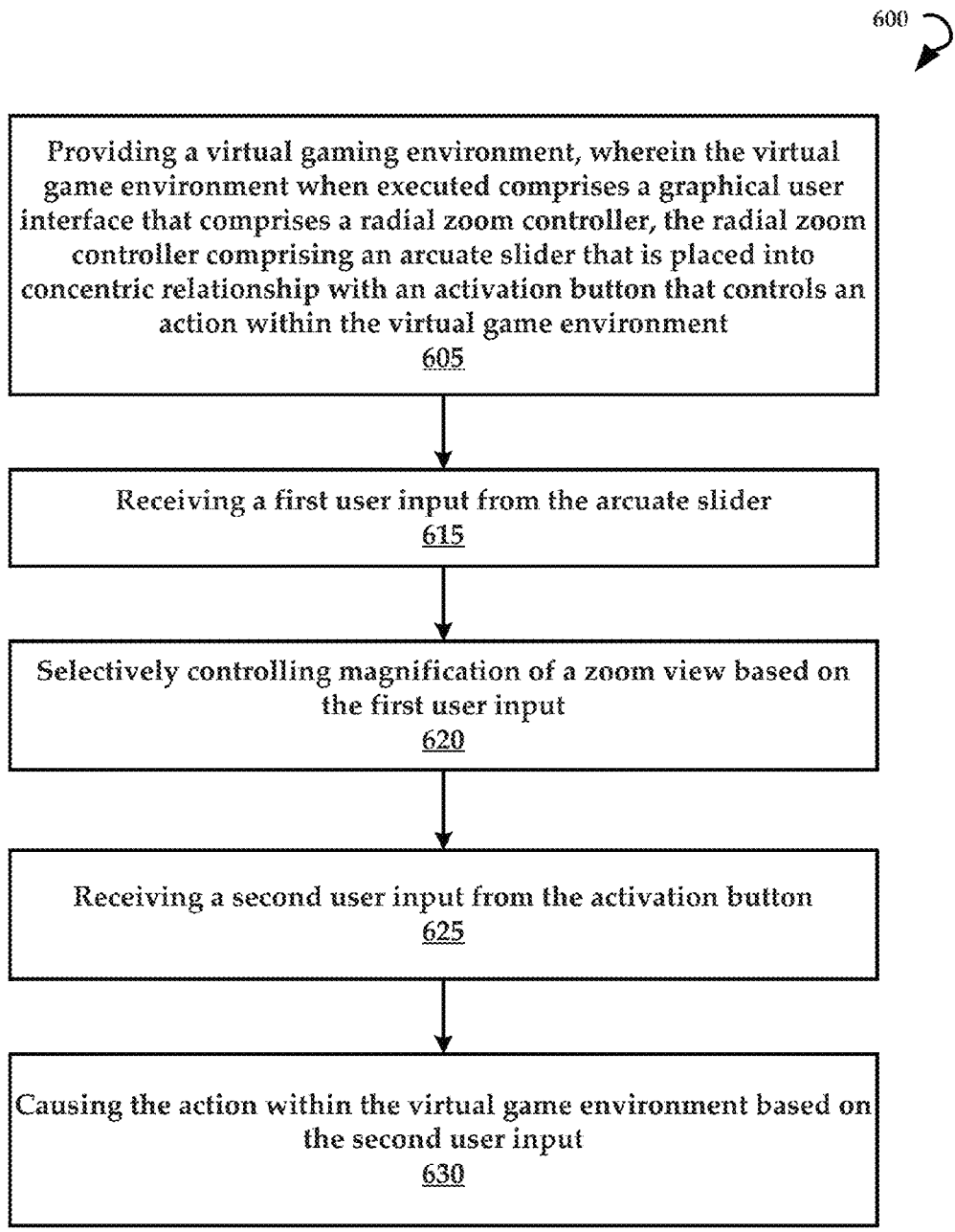
FIG. 6 is a flowchart of an example method for providing a radial zoom controller.

FIG. 6 illustrates an example method 600 of the present disclosure for providing a radial zoom control. The method 600 is executed within the context of a video game, where a video game environment is being provided to an end user. For example, the user can be engaged in video game play with their game device. An example video game could include a first person shooter game where the player is engaging in military style missions. When the user is playing the game, the user may decide to engage with a target that is set off from the player at a distance within the game environment.

During game play, the view of the game environment is provided with a radial zoom controller that is placed onto a location of a GUI, such as a corner.

Thus, the method 600 comprises providing 605 a virtual gaming environment. The virtual game environment comprises a graphical user interface that comprises a radial zoom controller.

As mentioned above, the radial zoom controller 202 comprises an arcuate slider 210 that is placed into concentric relationship with an activation button 212 that controls an action within the virtual game environment. In the example above, the activation button 212 can be utilized to fire a weapon.

In some embodiments, the method 600 includes receiving 615 a first user input from the arcuate slider. For example, the user can place a finger on the arcuate slider to engage activation of a zoom feature for a scope of a weapon. As the user draws their finger around the arcuate slider the magnification level of the scope will change. Therefore, in some embodiments, the method 600 includes selectively controlling 620 magnification of a zoom view based on the first user input.

Next, the method 600 comprises receiving 625 a second user input from the activation button. For example, the user can tap the activation button to fire the weapon. This second user input can be received independently from the first user input in some embodiments, and at the same time in other embodiments.

The method 600 can also comprise causing 630 the action within the virtual game environment based on the second user input. Again, if the action assigned to the activation button is the firing of a weapon, the action caused would be the firing of the weapon. In other embodiments, the activation button can be assigned any desired functionality by the user.

FIG. 7 illustrates another example method 700 of the present disclosure for providing a radial zoom control. The method 700 is also performed within the context of a virtual game environment as described above. According to some embodiments, the method 700 includes generating 705 a graphical user interface that comprises an initial view of a gaming environment comprising a target placed at a distance away from a user. An example of this initial view is provided in FIG. 2.

Next, the method 700 can include providing 710 a radial zoom controller within the graphical user interface. The radial zoom controller comprises, in some embodiments, an arcuate slider that is placed into concentric relationship with an activation button that controls an action within the virtual game environment. It will be understood that the arcuate slider comprises selectable magnification levels for an object within the gaming environment, such as a scope of a weapon, binoculars, and so forth.

According to some embodiments, the method 700 may include receiving 715 user input from the arcuate slider to select a magnification level of a zoom view. Again, the zoom view can be of a scope view of a weapon. In some embodiments the zoom view includes a close up view of the target.

In some embodiments, the method 700 comprises selectively adjusting 720 a magnification level of the zoom view as the user moves the arcuate slider. Zoomed views through a scope using different magnification levels are provided in FIGS. 3-5.

Figure 8A:
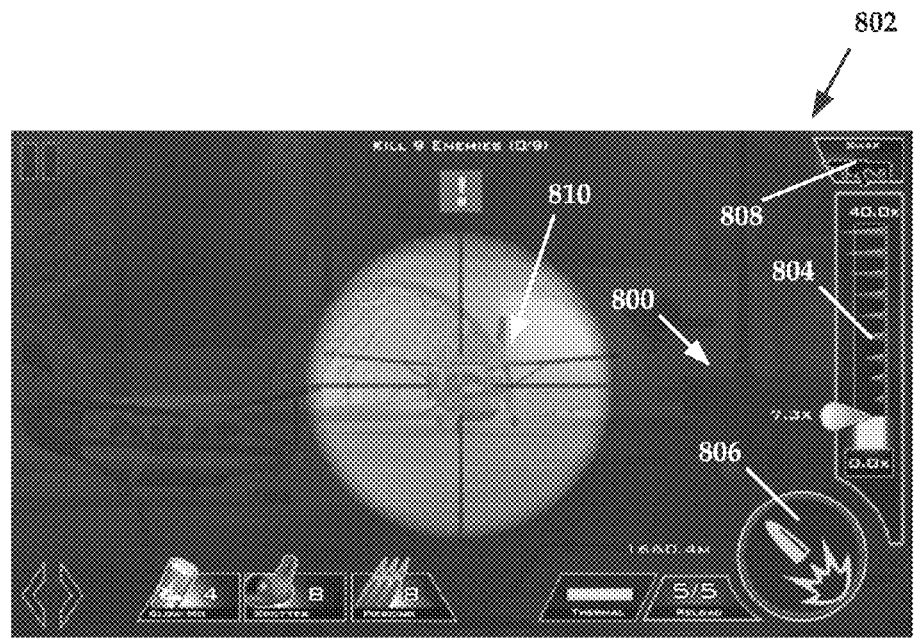
FIG. 8A is a GUI that comprises a linear zoom controller and a view of a target through a scope.

FIG. 8A illustrates another embodiment of a zoom controller that is linear in configuration. A linear zoom controller 800 is provided in a virtual environment 802. The linear zoom controller 800 comprises a linear zoom slider 804 and an actuation button 806. The linear zoom slider 804 is disposed on a right hand side of the UI and extends from above the actuation button 806 towards a top of the UI. The linear zoom slider 804 functions similarly to the arcuate slider of additional embodiments described herein. Furthermore, the actuation button 806 functions similarly to the actuation buttons of other embodiments herein.

In one embodiment, the GUI is provided with a weapon swap button 808 that allows the user to toggle through different weapons while using the zoom view.

The GUI includes a scope view of a target 810. The user can move the linear zoom slider 804 to change the magnification of the zoom view.

Figure 8B:
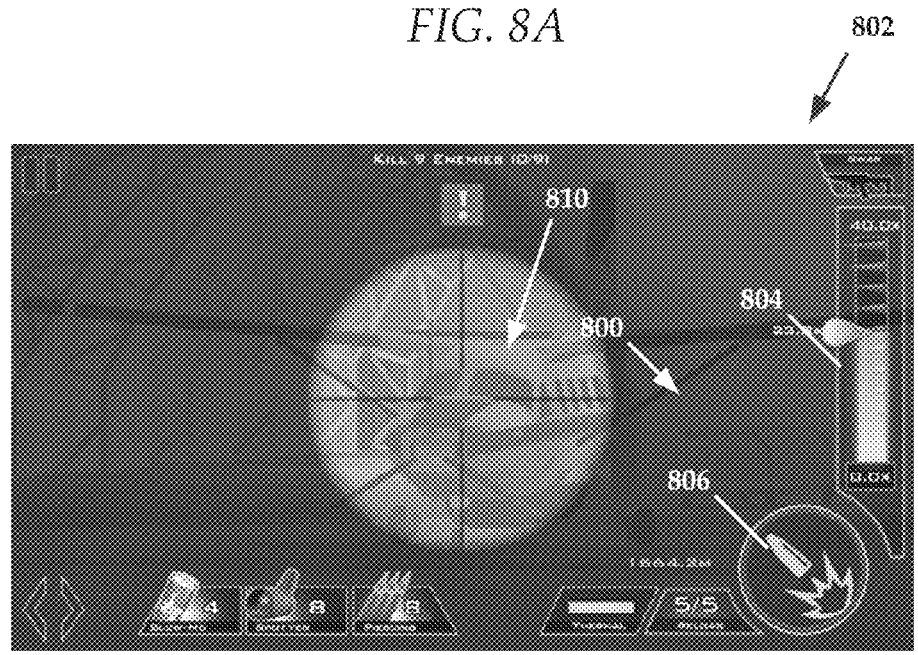
FIG. 8B illustrates a zoom view of a target of FIG. 8A.

FIG. 8B illustrates a zoomed in view of the target 810 which is caused by the user increasing the zoom of the linear zoom slider 804.

In some embodiments, the radial zoom controller can be combined with touchscreen features allowing for single or multi-touch gestures which can be used to selectively adjust a zoom view. For example, the user can utilize pinch and expand gestures to selectively adjust a zoom view. The user can combine use of the radial zoom controller and multi-touch input to fine tune a zoom action.

The user can utilize the multi-touch gesture anywhere on the display screen, whereas the radial zoom controller can be isolated its particular location on the display.

In some embodiments, rather than requiring the user to utilize the activation button to fire a weapon the use of touchscreen input allows the user to tap anywhere on the screen to fire the weapon. Thus, the user can utilize the radial zoom controller and/or the touchscreen gesture to selectively adjust the zoom view. The user can then tap anywhere on the display screen to activate the weapon.

According to some embodiments, the user device can implement 3D touch features where the display can sense pressure input from a user touch input. The radial zoom controller can be controlled using touch and pressure based input. For example, the harder the user presses, the more the zoom increases. The user can then follow with a tap input to fire the weapon. In addition to using touch/pressure input, the user device can provide the user with haptic feedback, such as a vibration when the weapon is fired. The user device can be configured to vibrate as the zoom view is selectively changed and provide a different haptic feedback that indicates that the weapon has been fired, as an example.

Figure 9:
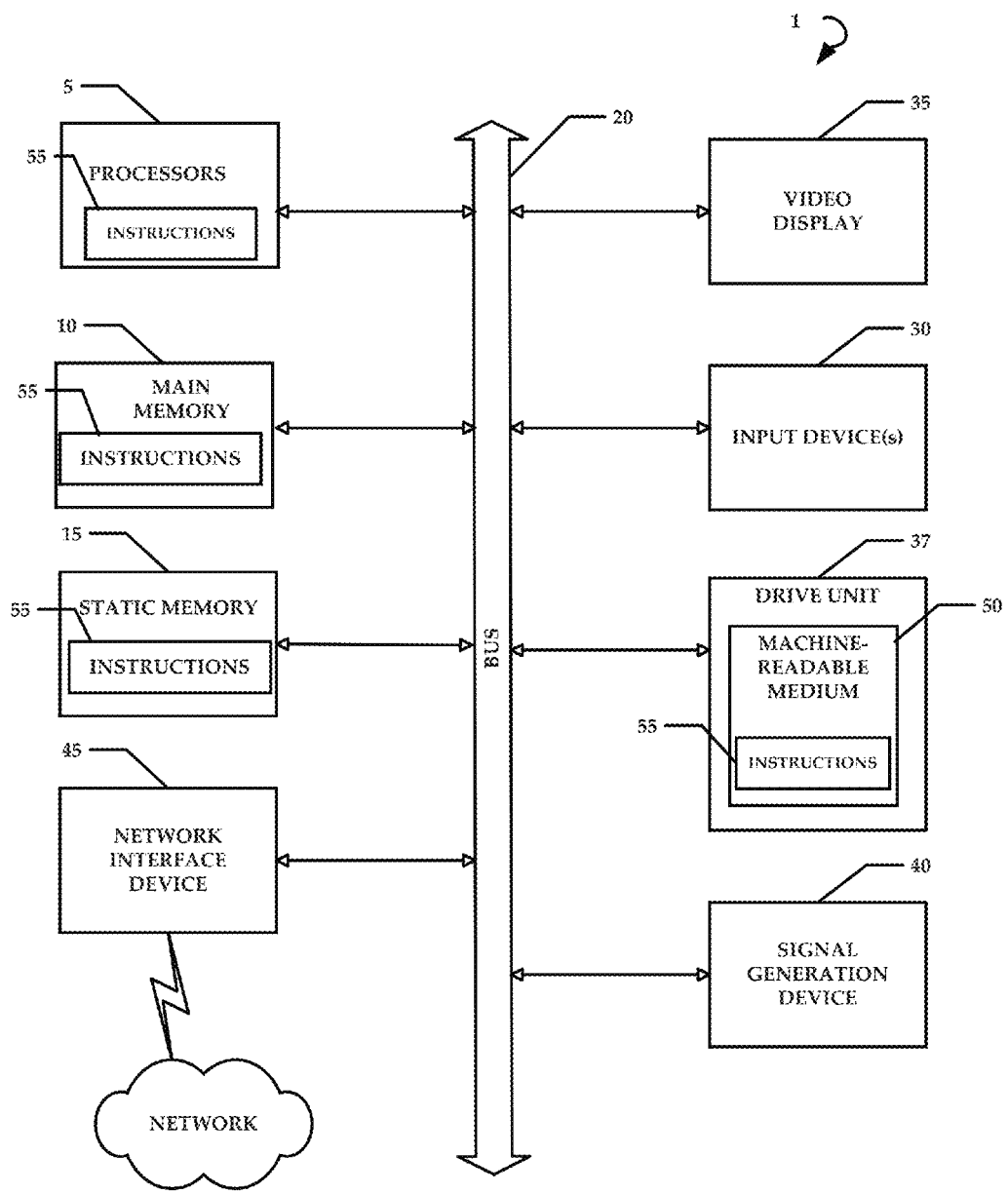
FIG. 9 is a schematic diagram of an example computing device that can be used to implement aspects of the present technology.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 and/or within the drive unit 37 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computing system, comprising: a processor and memory configured to provide a virtual gaming environment, the virtual gaming environment comprising a graphical user interface that comprises a radial zoom controller, the radial zoom controller being a first user input configured to allow a user to selectively control a zoom view, the radial zoom controller comprising an arcuate slider that is placed into concentric relationship with an activation button that allows the user to control an action within the virtual gaming environment, wherein a zoom level of the zoom view is further fine tuned using a multi-touch input that is received anywhere within a display of the computing system, further wherein a second user input is received through the activation button, wherein in response to the second user input the action comprises any of weapon reloading and weapon changing, further wherein a tap gesture user input is received through the activation button and a firearm is discharged.

2. The computing system according to claim 1, wherein the zoom view is from a point of view of a firearm.

3. The computing system according to claim 1, wherein the zoom view represents a view of a target through a scope.

4. The computing system according to claim 1, wherein the arcuate slider comprises demarcations that indicate magnification levels.

5. The computing system according to claim 1, wherein the radial zoom controller is set to a zoom level of zero and the graphical user interface comprises a view from a viewpoint of the user.

6. The computing system according to claim 1, wherein the radial zoom controller is set to a zoom level to greater than zero and the zoom view changes to a scope view.

7. The computing system according to claim 1, wherein the radial zoom controller comprises a distance measurement to a target included in the zoom view, the distance measurement comprising a distance between the target and the user.

8. The computing system according to claim 1, wherein the arcuate slider can receive tap input from a user to selectively place the zoom view at a particular magnification level.

9. The computing system according to claim 1, wherein the arcuate slider receives input from the user with a first finger and the activation button receives input from the user with a second finger.

10. A method, comprising:
providing a virtual gaming environment, the virtual gaming environment comprising a graphical user interface that comprises a radial zoom controller, the radial zoom controller comprising an arcuate slider that is placed into concentric relationship with an activation button that controls an action within the virtual gaming environment;
receiving a first user input from the arcuate slider;
selectively controlling magnification of a zoom view based on the first user input;
receiving a second user input through the activation button, wherein the action comprises any of weapon reloading and weapon changing;
causing the action within the virtual gaming environment based on the second user input;
receiving a tap gesture user input through the activation button; and
discharging a firearm based on the tap gesture user input.

11. The method according to claim 10, wherein the zoom view is from a point of view of the firearm.

12. The method according to claim 11, wherein the zoom view represents a view of a target through a scope of the firearm.

13. The method according to claim 10, further comprising providing demarcations on the arcuate slider that indicate magnification levels.

14. The method according to claim 10, further comprising providing an initial view that is a viewpoint of a player and the radial zoom controller is set to a zoom level of zero.

* * * * *